United States Patent
Cao et al.

(10) Patent No.: US 12,379,278 B2
(45) Date of Patent: Aug. 5, 2025

(54) APPARATUS FOR DETERMINING OIL LEAKAGE AND ROBOT USING THE APPARATUS

(71) Applicant: ABB SCHWEIZ AG, Baden (CH)

(72) Inventors: Xiaodong Cao, Shanghai (CN); Jiafan Zhang, Shanghai (CN)

(73) Assignee: ABB SCHWEIZ AG, Baden (CH)

(*) Notice: Subject to any disclaimer, the term of this patent is extended or adjusted under 35 U.S.C. 154(b) by 196 days.

(21) Appl. No.: 18/006,922

(22) PCT Filed: Sep. 18, 2020

(86) PCT No.: PCT/CN2020/116150
§ 371 (c)(1),
(2) Date: Jan. 26, 2023

(87) PCT Pub. No.: WO2022/056824
PCT Pub. Date: Mar. 24, 2022

(65) Prior Publication Data
US 2023/0280232 A1  Sep. 7, 2023

(51) Int. Cl.
*G01M 3/16* (2006.01)
*G01M 3/04* (2006.01)

(52) U.S. Cl.
CPC .............. *G01M 3/16* (2013.01); *G01M 3/042* (2013.01)

(58) Field of Classification Search
None
See application file for complete search history.

(56) References Cited

U.S. PATENT DOCUMENTS

| 4,855,706 A | 8/1989 | Hauptly |
| 4,862,066 A | 8/1989 | Sato |
| 2015/0330930 A1 | 11/2015 | Gao et al. |

FOREIGN PATENT DOCUMENTS

| CN | 103969294 A | | 8/2014 |
| CN | 205981574 U | * | 2/2017 |
| CN | 110231374 A | | 9/2019 |
| CN | 210293575 U | | 4/2020 |
| CN | 111262378 A | | 6/2020 |

(Continued)

OTHER PUBLICATIONS

English Translation of CN-205981574-U (Year: 2017).*

(Continued)

*Primary Examiner* — Alexander A Mercado
(74) *Attorney, Agent, or Firm* — GREENBERG TRAURIG, LLP

(57) ABSTRACT

An apparatus for determining oil leakage of a gearbox and an associated robot. The apparatus includes a base arranged between the gearbox and a motor coupled to the gearbox. The base can be made of a oil-absorbing material such that a volume of the base changes when the base contacts oil. The apparatus also includes a signal generator coupled to the base and configured to cause an electrical signal or a change in a physical property of the signal generator in response to a change in the volume of the base. The apparatus also includes a controller coupled to the signal generator and configured to detect the electrical signal or the change in the physical property and to determine the oil leakage in response to a detection of the electrical signal or the change in the physical property.

16 Claims, 5 Drawing Sheets

(56) References Cited

FOREIGN PATENT DOCUMENTS

| CN | 211018539 U | 7/2020 |
|---|---|---|
| DE | 10314924 A1 | 11/2004 |
| EP | 1916509 A1 | 4/2008 |
| GB | 1355176 A | 6/1974 |
| JP | H09288030 A | 11/1997 |
| WO | 2014115007 A1 | 7/2014 |

OTHER PUBLICATIONS

International Search Report and Written Opinion; issued by the ISA/CN National Intellectual Property Administration; regarding corresponding patent application Serial No. PCT/CN2020/116150; dated Jun. 17, 2021; 10 pages.

\* cited by examiner

APPARATUS FOR DETERMINING OIL LEAKAGE AND ROBOT USING THE APPARATUS

CROSS-REFERENCE TO RELATED APPLICATIONS

This is a national stage application claiming priority to International patent application Serial No.: PCT/CN2020/116150, filed on Sep. 18, 2020; which is herein incorporated by reference in its entirety.

FIELD

Embodiments of the present disclosure generally relate to a robot, and more specifically, to an apparatus for determining oil leakage of a gearbox used in a joint of a robot.

BACKGROUND

Robots are widely-used automation mechanisms that increase operational efficiency and accuracy. A robot typically comprises robot arm links and joints. The robot arm link can be driven to rotate or move by a motor arranged in the joint or a base. To meet the reduction ratio requirements, a gearbox needs to be arranged between the motor and the robot arm links to be driven. The gearbox is a device that uses gears and gear trains to provide speed and torque conversions from a rotating power source to another device.

Oil is usually provided in the gearbox to provide lubrication for the gears and other components. Besides the lubrication function for the individual elements to substantially reduce friction, oil in the gearbox can also cool the heated subassemblies as well as mitigate and attenuate gear strokes. In addition, it reduces vibration, protects against corrosion, and keeps everything clean.

For robotic applications, a motor is typically coupled to a gearbox with the motor's shaft extending into an oil cavity of the gearbox. The aging of seals used to seal the oil cavity results in problems in preventing oil in the oil cavity from entering the motor and thereby adversely affecting the operation of the motor.

SUMMARY

Embodiments of the present disclosure provide an apparatus for determining oil leakage of a gearbox and an associated robot to at least in part solve the above and other potential problems.

In a first aspect, an apparatus for determining oil leakage of a gearbox is provided. The apparatus comprises a base arranged between the gearbox and a motor coupled to the gearbox, the base made of a functional oil-absorbing material such that a volume of the base changes when the base contacts oil; a signal generator coupled to the base and configured to cause an electrical signal or a change in a physical property of the signal generator in response to a change in the volume of the base; and a controller coupled to the signal generator and configured to detect the electrical signal or the change in the physical property and to determine the oil leakage in response to a detection of the electrical signal or the change in the physical property.

With the apparatus according to embodiments of the present disclosure, before oil leaks into the motor, the user already knows of the leakage or the motor has already been stopped. In this case, the user may only need to replace the damaged or aging seal ring to restore the robot joint to a normal operation state. In this way, maintenance costs can be reduced. More importantly, the robot using the apparatus according to embodiments of the present disclosure can be operated more safely.

In some embodiments, the apparatus further comprises a housing arranged on a fixed part of the motor and comprising a groove for receiving the base. In this way, the apparatus can be more easily mounted on the motor.

In some embodiments, the signal generator comprises a signal cable coupled to the controller and comprising a first part and a second part which are disconnected; a first electrode connected to the first part; and a second electrode connected to the second part, wherein at least one of the first electrode and the second electrode is arranged on the base and adapted to, in response to the change in the volume of the base, electrically contact the housing to connect the first and second parts, so that the controller detects the electrical signal. This arrangement can easily accomplish the determination of oil leakage of the gearbox.

In some embodiments, both of the first electrode and the second electrode are arranged on the base and adapted to electrically contact different portions of the housing in response to the change in the volume of the base. This arrangement can facilitate the mounting of the apparatus on the motor, thereby improving the mounting efficiency.

In some embodiments, the different portions of the housing contacting the first electrode and the second electrode are electrically conductive. This arrangement can ensure the generation of the electrical signal of the signal generator, improving the reliability of the apparatus.

In some embodiments, the first electrode is arranged on the base and the second electrode is arranged on the housing, and the first electrode is adapted to electrically contact the housing in response to the change in the volume of the base. This arrangement can facilitate the maintenance of the apparatus, thereby improving the maintenance efficiency.

In some embodiments, the function oil-absorbing material comprises an oil swelling rubber.

In some embodiments, the physical property comprises at least one of volume, temperature, color or hardness.

In some embodiments, the housing comprises a wire slot adapted for at least one of the first and second parts of the signal generator to be arranged therein. As a result, the cables arranged in the wire slot will not be easily damaged, thereby improving the reliability of the device.

In some embodiments, the apparatus further comprises a radial sealing arranged between a rotatable part of the motor and the housing. The radial sealing can provide an additional sealing protection.

In some embodiments, the apparatus further comprises an additional sleeve arranged on the rotatable part and adapted to rotate with the rotatable part. This arrangement can improve the adaptability of the apparatus.

In a second aspect, a robot is provided. The robot comprises at least one joint and at least one apparatus according to the first aspect as mentioned above.

It is to be understood that the Summary is not intended to identify key or essential features of embodiments of the present disclosure, nor is it intended to be used to limit the scope of the present disclosure. Other features of the present disclosure will become readily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, the same reference numerals usually represent the same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Gearboxes and motors are common components in the joints of a robot. A motor usually comprises a brake mechanism to reduce a rotation speed of an arm of a joint quickly or to hold arms of a joint in position. A gearbox is typically provided with an oil cavity for receiving oil to lubricate the individual elements to substantially reduce friction and to fulfill other necessary functions. To make the joint more compact, a motor's shaft is usually inserted into the oil cavity to engage with gears arranged in the oil cavity.

A seal is provided around the motor shaft to prevent oil from entering the motor. However, with long periods of operation, the seal surrounding the motor shaft may fail due to long-term wear, which will result in oil entering into the motor. The oil entering the motor will accelerate the aging of insulating parts in the motor. In addition, and more importantly, once oil enters the motor's brake mechanism, there is a risk of failure of the brake mechanism, which may cause a major accident. For example, if the motor's brake mechanism for stopping or holding the second and third arms fails, the third arm may slip off due to the brake mechanism failure, which may damage surrounding equipment and/or threaten personal safety.

Conventional solutions to prevent oil from entering the motor are to employ a double-seal structure, which comprises two seals. A detection hole is provided between the two seals for an operator to observe oil leaking through one of the seals adjacent to the oil cavity. If the oil is observed through the detection hole, it means that at least one of the two seals is damaged, and the motor or double-seal structure needs to be replaced in time. However, there is currently no way to know if an oil leakage has occurred for those motors wrapped inside a joint.

Figure 1:
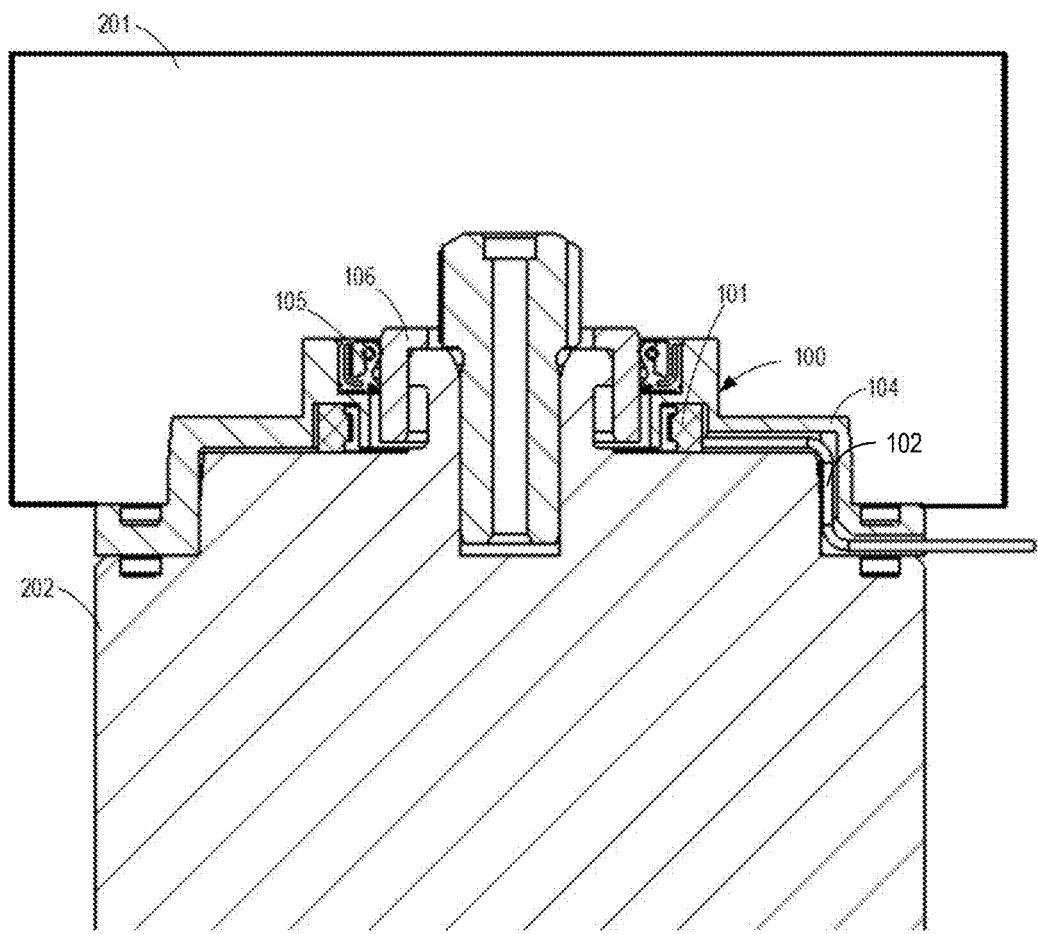
FIG. 1 shows a cross-sectional view of an apparatus for determining oil leakage of a gearbox arranged between a gearbox and a motor according to embodiments of the present disclosure.
Figure 2:
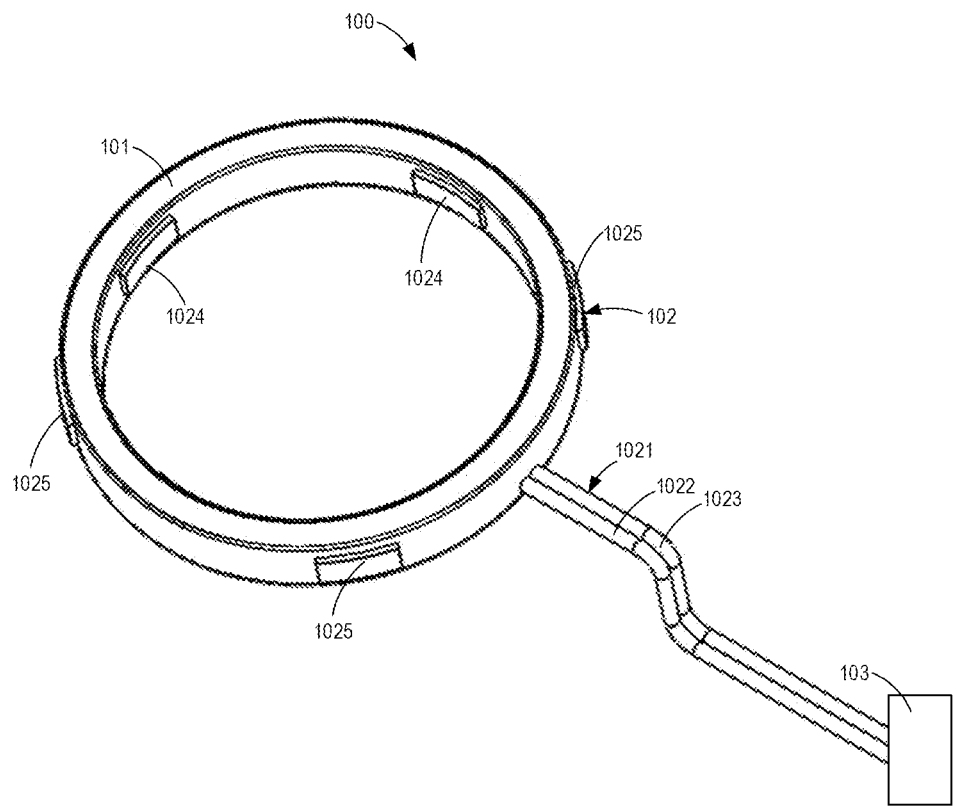
FIG. 2 shows an exploded view of an apparatus according to embodiments of the present disclosure.
Figure 2:
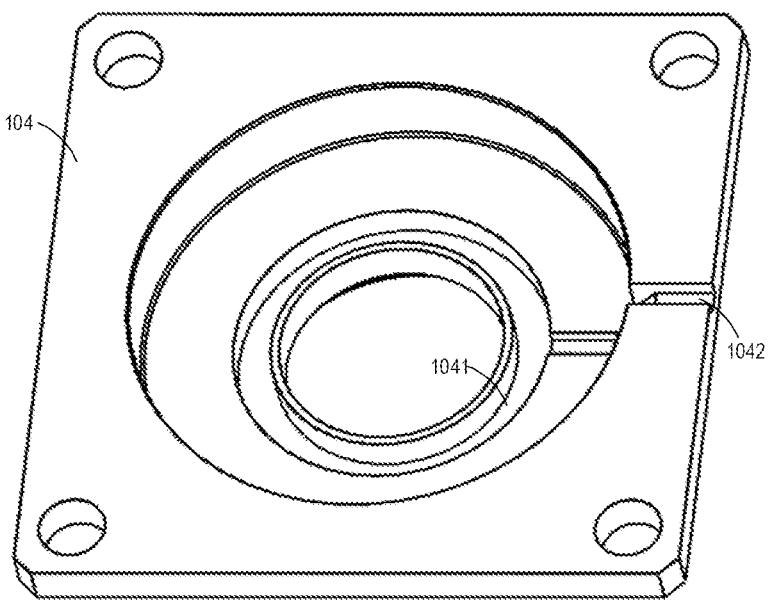

In order to at least partially address the above and other potential problems, embodiments of the present disclosure provide an apparatus for determining oil leakage of a gearbox. FIG. 1 shows a cross-sectional view of an apparatus 100 for determining oil leakage of a gearbox 201 arranged between the gearbox 201 and a motor 202; and FIG. 2 shows an exploded view of an apparatus 100 according to embodiments of the present disclosure.

As shown, generally, the apparatus 100 for determining oil leakage of the gearbox 201 comprises a base 101, a signal generator 102, and a controller 103. The base 101 is arranged between the gearbox 201 and the motor 202 which is coupled to the gearbox 201. The base 101 is made of a functional oil-absorbing material that changes a volume thereof when contacting oil. For example, in some embodiments, the functional oil-absorbing material comprises an oil swelling rubber. That is, the base 101 may be made of an oil swelling rubber. The oil swelling rubber is a type of polymer functional oil-absorbing material, which mainly comprises a rubber matrix and lipophilic functional groups or lipophilic components. The base 101 made of the oil swelling rubber can swell when contacting oil. The swelling base 101 can act as a further seal to prevent oil from entering the motor 202. Alternatively, in some embodiments, the base 101 may also shrink when contacting oil.

Of course, it is to be understood that the embodiments where the functional oil-absorbing material comprises an oil swelling rubber are merely for illustrative purposes, without suggestion any limitation as to the scope of the present disclosure. Other suitable material that can change its volume when exposed to or contacting oil is also possible. For example, in some alternative embodiments, the functional oil-absorbing material may also comprise a polymer material such as resins that swell when exposed to oil.

The base 101 is arranged so that when oil leakage of the gearbox 201 occurs, the oil will first contact the base 101. Thus, if the base 101 swells, it means that the base 101 is in contact with oil from the gearbox 201. To make the swelling of the base 101 easier to be detected electronically, the signal generator 102 coupled to the base 101 is provided. The signal generator 102 can cause an electrical signal or a change in a physical property thereof in response to a change in the volume of the base 101. For example, in some embodiments, at least one of the physical properties of the signal generator 102, such as a volume, a temperature, a color or a hardness, can be changed when the volume of the base 101 changes.

For example, in some embodiments, the temperature of the signal generator 102 may be changed when the volume of the base 101 changes. The change in the temperature can be detected by the controller 103. That is, a response to the change in the temperature exceeding a threshold indicates that the base 101 is in contact with oil. Thus, the controller 103 can determine the oil leakage of the gearbox 201. Alternatively or additionally, the signal generator 102 may also change color or hardness when the base 101 swells.

It is to be understood that the above embodiments about the change in the physical property are merely for illustrative purposes, without suggesting any limitation as to the scope of the present disclosure. Any structure or material can be used as the signal generator 102 as long as it can change detectable or observable physical properties when the base 101 swells. For example, in some embodiment, the signal generator 102 may shrink or may be squeezed to reduce a volume when the base 101 swells.

Alternatively or additionally, as mentioned above, the signal generator 102 also can cause an electrical signal to be detected by the controller 103. The electrical signal, which is easier to detect compared to a change in physical property, can then be detected by the controller 103. Upon detecting the electrical signal, the controller 103 can determine oil leakage of the gearbox 201. In some embodiments, the electrical signal may be a current signal or a voltage signal. In some embodiments, the electrical signal may also refer to changes in a current or voltage signal, such as a rising or falling edge of the current. For example, electrical signals may refer to current signals dropping from a certain value to zero or rising from zero to a certain value.

Upon determining oil leakage, users may be notified or warned in various ways. For example, in some embodiments, an indicator such as a lamp may be coupled to the signal generator 102. When the electrical signal is generated in response to the change in volume of the base 101, the lamp may be turned on automatically to notify users about the oil leakage. In some alternative embodiments, the color change of the signal generator 102 in response to a change of the volume of the base 101 can be observed by users to indicate the oil leakage of the gearbox 201. That is, if users observe that the color of the signal generator 102 has changed, it means that an oil leak has occurred.

The above description indicates that oil leakage can be observed more intuitively. Of course, it is to be understood that other methods can also inform users about the determined oil leakage. For example, when the controller 103 determines that an oil leakage of the gearbox 201 has occurred, the controller 103 may directly, or indirectly through other controllers 103, push notification or warning of the oil leakage to an external device such as a cell phone used by the user. Alternatively or additionally, the controller 103 may also be configured to stop the motor 202 when determining an oil leakage before notifying or warning users. In some embodiments, the controller 103 may be a controller of a robot in which the apparatus 100 is used. In some alternative embodiments, the controller 103 may also be a controller independent of the controller of the robot.

In this way, before oil leaks into the motor 202, the user already knows, or the motor 202 has already been stopped. In this case, the user may only need to replace the damaged seal ring to restore the robot joint to a normal operation state. In this way, maintenance costs can be reduced. More importantly, the robot using the apparatus 100 according to embodiments of the present disclosure can be operated more safely.

Figure 3:
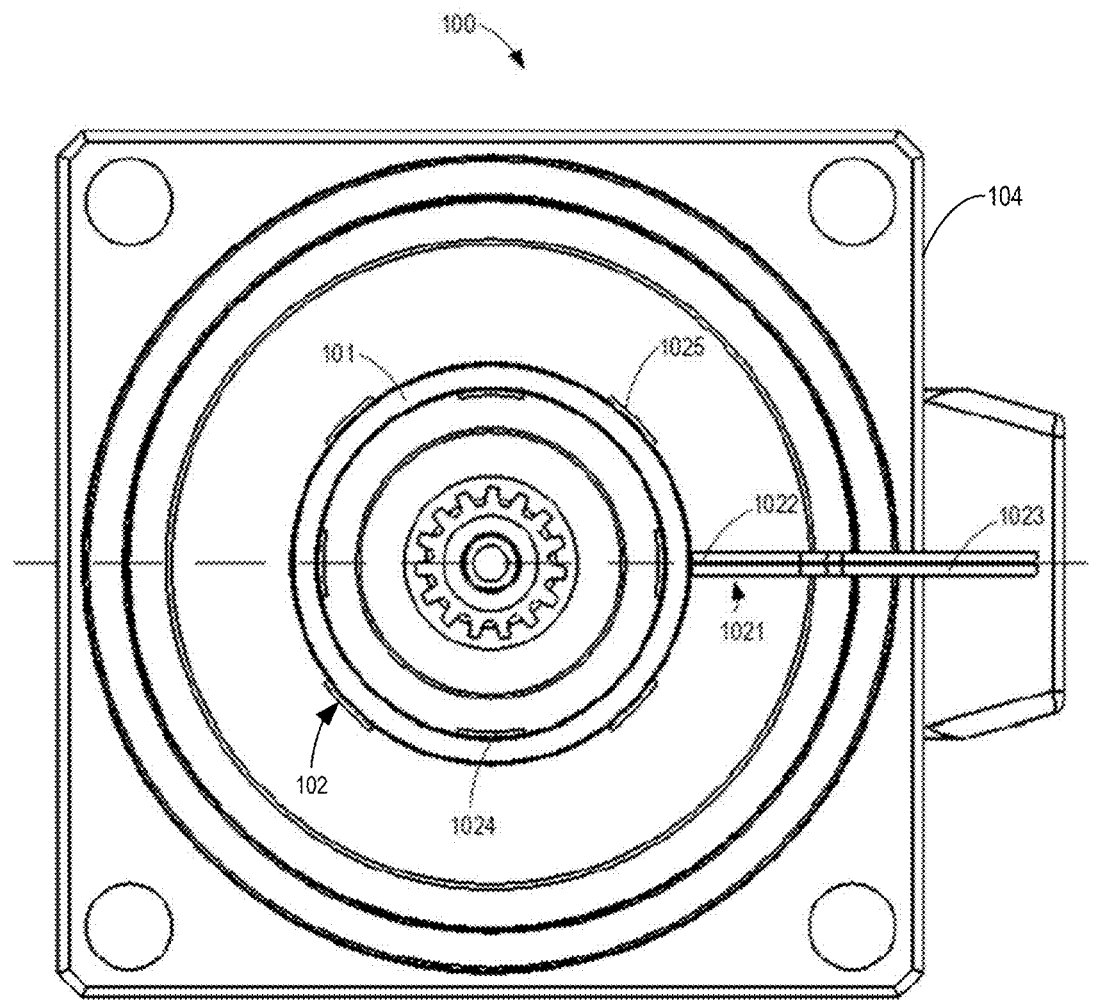
FIG. 3 shows a top view of a motor with an apparatus according to embodiments of the present disclosure.

In some embodiments, the apparatus 100 may also comprise a housing 104 arranged on a fixed part of the motor 202, as shown in FIGS. 1-3. The housing 104 comprises a groove 1041 for receiving the base 101. As a result, the apparatus 100 can be easily mounted between the motor 202 and the gearbox 201.

Figure 4:
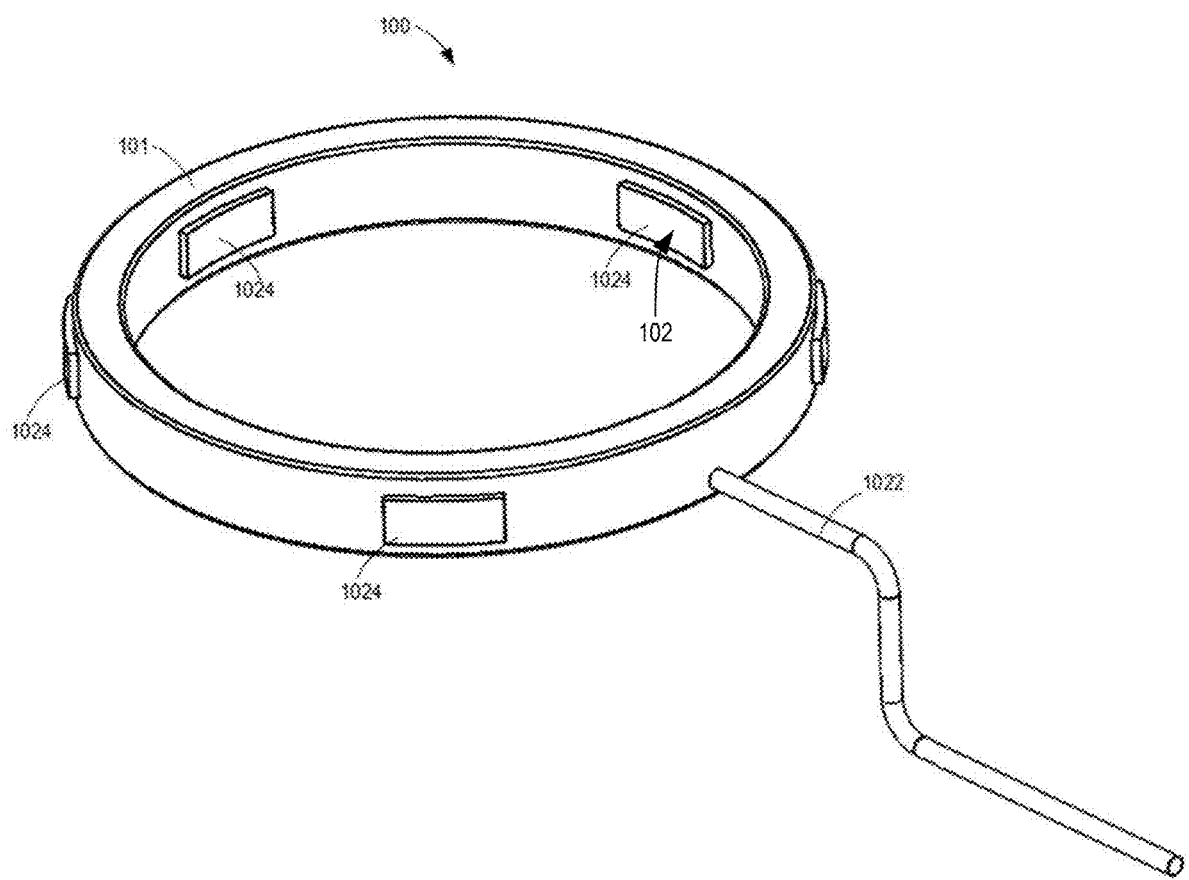
FIG. 4 shows a perspective view of a part of an apparatus according to further embodiments of the present disclosure.

To achieve the above functions of causing the electrical signal when the volume of the base 101 changes, in some embodiments, the signal generator 102 may comprise a signal cable 1021 and two electrodes, as shown in FIGS. 2 and 4. For ease of discussion, the two electrodes will be referred to as a first electrode 1024 and a second electrode 1025, respectively.

The signal cable 1021 comprises two parts, namely, a first part 1022 and a second part 1023. The first electrode 1024 is connected to the first part 1022 and the second electrode 1025 is connected to the second part 1023. At least one of the first electrode 1024 and the second electrode 1025 is arranged on the base 101 and can electrically contact the housing 104 to connect the first and second parts 1022, 1023 in response to the change in the volume of the part, so that the controller 103 can detect the electrical signal. To ensure the electrode contacts the housing 104 when the oil leakage occurs, at least one of the first and second electrodes 1024, 1025 may comprise a plurality of sub-electrodes. The sub-electrodes of the first or second electrode 1024, 1025 are electrically conductive.

In some embodiments, as shown in FIG. 2, both of the first and second electrodes 1024, 1025 are arranged on the base 101. For example, each of the first and second electrodes 1024, 1025 may comprise three or four or more sub-electrodes which may be evenly arranged on the base 101. In those embodiments, the first electrode 1024 is arranged on an inner surface and the second electrode 1025 is arranged on an outer surface of the base 101. In some alternative embodiments, the first electrode 1024 and the second electrode 1025 may also be embedded in the base 101 with portions protruding from the inner surface and outer surface, respectively.

When the base 101 is placed in the groove 1041 of the housing 104 and has not yet swelled, at least one of the first electrode 1024 and second electrode 1025 does not contact the housing 104. When the oil leakage of the gearbox 201 occurs and the oil contacts the base 101, the base 101 will swell to cause the first electrode 1024 and second electrode 1025 to contact different portions of the housing 104. In this way, the first part 1022 and the second part 1023 of the signal cable 1021 can be connected through the first and second electrodes 1024, 1025 and the housing 104. With the connection of the first part 1022 and the second part 1023, there will be current flowing through the signal cable 1021, which can be achieved in suitable ways.

For example, in some embodiments, one of the first part 1022 and the second part 1023 can be connected to a power source and a resistance. When the gearbox 201 does not leak oil, the signal cable 1021 is disconnected and there is no current flowing therein. When the oil leakage occurs and the oil contacts the base 101, the base 101 swells to cause the first electrode 1024 and the second electrode 1025 to contact the housing 104, the signal cable 1021 is then conductive. In this way, the current will flow in the signal cable 1021 and can be detected by the controller 103.

In some alternative embodiments, the physical property of the signal generator 102 may comprise a resistance of the signal cable 1021. When the signal cable 1021 is disconnected, the resistance thereof is infinite. When the signal cable 1021 is conductive by connecting the first part 1022 and the second part 1023 due to oil leakage, the resistance of the signal cable 1021 becomes zero or other non-infinite values. Upon detecting the change in the resistance of the signal cable 1021, the controller 103 can determine that the oil leakage occurs.

Of course, it is to be understood that the above embodiments where both of the first and second electrodes 1024, 1025 are arranged on the base 101 are merely for illustrative purposes, without suggesting any limitation as to the scope of the present disclosure. Other arrangement or structure is also possible.

Figure 5:
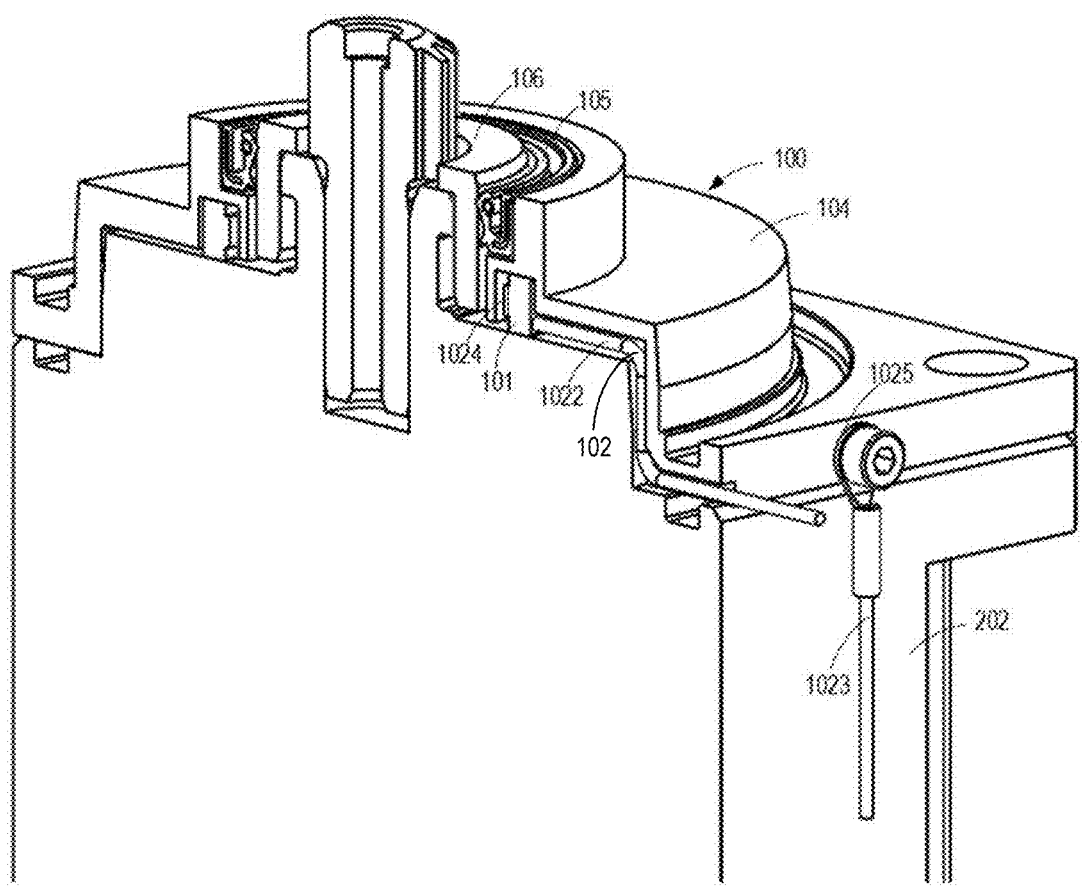
FIG. 5 shows a partial cut-away view of a motor with an apparatus according to further embodiments of the present disclosure.

For example, in some alternative embodiments, the first electrode 1024 is arranged on the base 101 and the second electrode 1025 is arranged on the housing 104, as shown in FIGS. 4 and 5. When the base 101 is placed in the groove 1041 of the housing 104 and has not yet swelled, the first electrode 1024 does not contact the housing 104. The first and second parts of the signal cable 1021 are disconnected. When the oil leakage of the gearbox 201 occurs and the oil contacts the base 101, the base 101 will swell which causes the first electrode 1024 to contact the housing 104. In this way, the first part 1022 and the second part 1023 of the signal cable 1021 can be connected through the first and second electrodes 1024, 1025 and the housing 104. Accordingly, the controller 103 can detect the electrical signal and the change in the physical property of the signal generator 102, thus determining the oil leakage.

In some embodiments, the whole part of the housing 104 may be made of metal, ensuring that the signal cable 1021 is conductive when the electrodes contact the housing 104. In some alternative embodiments, only portions of the housing 104 that will contact the first electrode 1024 and/or the second electrode 1025 are electrically conductive. For example, these portions of the housing 104 may be conductive by arranging metal wires, sheets or tabs. As a result, other portions of the housing 104 can be made of non-metal, thereby reducing the cost and weight of the apparatus 100.

In some embodiments, the apparatus 100 may also comprise a radial sealing 105 between a rotatable part such as a shaft of the motor 202 and the housing 104, as shown in FIGS. 1 and 5. The radial sealing 105 can provide an additional sealing protection to the oil cavity of the gearbox 201. The oil leaking from the gearbox 201 will be first blocked from leaking outside of the apparatus 100 due to the radial sealing 105, without affecting the motor 202. Even if the radial sealing 105 is damaged, the oil leakage can be known in time before it enters the motor 202. It is only necessary to replace seals of the gearbox 201 and the radial sealing 105 of the apparatus 100, without replacing the motor 202 or the entire joint, which significantly reduces the cost.

In some embodiments, in order to improve adaptability, the apparatus 100 may further comprise an additional sleeve 106, as shown in FIGS. 1 and 5. The additional sleeve 106 may be arranged on the rotatable part such as the shaft of the motor 202 and can rotate with the rotatable part. In those embodiments, the radial sealing 105 is arranged between the additional sleeve 106 and the housing 104. In this way, no matter the structure of the rotatable part of the motor 202, the apparatus 100 can be applied to it. As a result, the apparatus 100 can be applied to various motors, which significantly improves the adaptability of the apparatus 100.

To facilitate the arrangement of the signal cable 1021, in some embodiments, the housing 104 may comprise a wire slot 1042. The wire slot 1042 allows at least one of the first and second parts 1022, 1023 to be arranged therein. In this way, the signal cable 1021 arranged in the wire slot 1042 can be protected from being damaged, thereby improving the reliability of the apparatus 100.

According to other aspects of the present disclosure, a robot is provided. The robot comprises at least one joint and at least one apparatus 100 as mentioned above. With the apparatus 100 according to embodiments of the present disclosure, the oil leakage of the gearbox 201 can be determined in time before affecting the performance of the motor 202. In this way, the reliability of the robot is improved.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for determining oil leakage of a gearbox, comprising:
    a base arranged between the gearbox and a motor coupled to the gearbox, the base made of a functional oil-absorbing material such that a volume of the base changes when the base contacts oil;
    at least one electrode coupled to the base and configured to conduct an electrical signal in response to a change in a physical property of the at least one electrode, wherein the physical property including a resistance of the at least one electrode in response to a change in the volume of the base; and
    a controller coupled to the at least one electrode and configured to detect the electrical signal and to determine the oil leakage in response to the change in the physical property.

2. The apparatus of claim 1, further comprising:
    a housing arranged on a fixed part of the motor and comprising a groove for receiving the base.

3. The apparatus of claim 2, further comprising:
    a signal cable coupled to the controller and comprising a first part and a second part which are disconnected by the at least one electrode;
    wherein the at least one electrode comprises:
        a first electrode connected to the first part, and
        a second electrode connected to the second part,
    wherein at least one of the first electrode and the second electrode is arranged on the base and adapted to, in response to the change in the volume of the base, electrically contact the housing to connect the first part and the second part, so that the controller detects the electrical signal.

4. The apparatus of claim 3, wherein both of the first electrode and the second electrode are arranged on the base and adapted to electrically contact different portions of the housing in response to the change in the volume of the base.

5. The apparatus of claim 4, wherein the different portions of the housing contacting the first electrode and the second electrode are electrically conductive.

6. The apparatus of claim 4, wherein the housing comprises:
    a wire slot adapted for at least one of the first part and the second part to be arranged therein.

7. The apparatus of claim 3, wherein the first electrode is arranged on the base and the second electrode is arranged on the housing, and
    the first electrode is adapted to electrically contact the housing in response to the change in the volume of the base.

8. The apparatus of claim 3, wherein the housing comprises:
    a wire slot adapted for at least one of the first part and the second part to be arranged therein.

9. The apparatus of claim 3, wherein the functional oil-absorbing material comprises an oil swelling rubber.

10. The apparatus of claim 3, further comprising:
    a radial sealing arranged between a rotatable part of the motor and the housing.

11. The apparatus of claim 2, wherein the functional oil-absorbing material comprises an oil swelling rubber.

12. The apparatus of claim 2, further comprising:
a radial sealing arranged between a rotatable part of the motor and the housing.

13. The apparatus of claim 1, wherein the functional oil-absorbing material comprises an oil swelling rubber.

14. The apparatus of claim 1, further comprising:
a radial sealing arranged between a rotatable part of the motor and a housing.

15. The apparatus of claim 14, further comprising:
an additional sleeve arranged on the rotatable part and adapted to rotate with the rotatable part.

16. A robot, comprising:
at least one joint; and
at least one apparatus of claim 1 arranged on the at least one joint.

* * * * *